(12) United States Patent
Koyama et al.

(10) Patent No.: US 6,932,481 B2
(45) Date of Patent: Aug. 23, 2005

(54) PROJECTION DISPLAY SYSTEM, PROJECTOR AND MENU IMAGE DISPLAY METHOD FOR SAME

(75) Inventors: Takaaki Koyama, Matsumoto (JP); Yasutaka Kamiya, Matsumoto (JP); Shoichi Akaiwa, Matsumoto (JP); Toru Karasawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/902,154

(22) Filed: Jul. 30, 2004

(65) Prior Publication Data

US 2005/0007561 A1 Jan. 13, 2005

Related U.S. Application Data

(63) Continuation of application No. 09/959,988, filed as application No. PCT/JP01/02380 on Mar. 23, 2001.

(30) Foreign Application Priority Data

Mar. 27, 2000 (JP) ........................................ 2000-085713

(51) Int. Cl.[7] ........................ G03B 21/26; G03B 21/00; H04N 5/445; G09G 5/00
(52) U.S. Cl. ........................... 353/94; 353/31; 348/564; 345/619
(58) Field of Search ........................... 353/31, 94, 122; 348/563–564; 345/619, 902, 716, 810

(56) References Cited

U.S. PATENT DOCUMENTS

| | | | |
|---|---|---|---|
| 3,985,431 A | 10/1976 | Lindstrom | 353/94 |
| 4,086,005 A | 4/1978 | Honebrink et al. | 352/133 |
| 5,528,263 A | 6/1996 | Platzker et al. | 345/156 |
| 5,626,411 A | * 5/1997 | Takahashi et al. | 353/94 |
| 5,724,775 A | 3/1998 | Zobel, Jr. et al. | 52/82 |

(Continued)

FOREIGN PATENT DOCUMENTS

| | | |
|---|---|---|
| JP | A-4-271595 | 9/1992 |
| JP | A-6-295152 | 10/1994 |
| JP | 07-120836 | 5/1995 |
| JP | 08-172676 | 7/1996 |
| JP | 09-331491 | 12/1997 |
| JP | 10-49068 | 2/1998 |
| JP | 11-75145 | 3/1999 |
| JP | A-11-298830 | 10/1999 |
| JP | 2001-268476 | 9/2001 |

OTHER PUBLICATIONS

European Search Report.

*Primary Examiner*—Rodney Fuller
*Assistant Examiner*—Magda Cruz
(74) *Attorney, Agent, or Firm*—Oliff & Berridge, PLC (57) ABSTRACT

To provide a technique for facilitating control of a plurality of projectors. A projection display system comprises a plurality of projectors wherein a plurality of images projected by the projectors are displayed on a common projection screen. Each projector comprises: a control signal processor for processing a control signal given from an external device and generating a processed control signal; and a signal input/output section for input/output of the control signal and the processed control signal. The plurality of projectors are coupled in a cascade connection, by interconnecting the signal input/output sections of the projectors. The control signal and the processed control signal include connection sequence data indicating the cascade connection sequence. The control signal processor of each projector comprises a memory for storing, on the basis of a given control signal, a connection sequence when the projectors are coupled in a cascade connection.

7 Claims, 10 Drawing Sheets

U.S. PATENT DOCUMENTS

| | | | |
|---|---|---|---|
| 5,826,211 A | 10/1998 | Kobayashi | 701/115 |
| 5,988,817 A | 11/1999 | Mizushima et al. | 353/94 |
| 6,257,982 B1 | 7/2001 | Rider et al. | 463/31 |
| 6,309,072 B1 | 10/2001 | Deter | 353/31 |
| 6,324,181 B1 | 11/2001 | Wong et al. | 370/403 |
| 6,335,739 B1 | 1/2002 | Matsukura et al. | 715/755 |
| 6,405,242 B1 | 6/2002 | Watanabe et al. | 709/205 |
| 6,450,647 B1 | 9/2002 | Takeuchi | 353/69 |
| 6,538,675 B2 | 3/2003 | Aratani et al. | 715/856 |
| 6,540,363 B1 | 4/2003 | Steffensmeier | 353/31 |
| 6,540,365 B1 | 4/2003 | Fujiwara et al. | 353/69 |
| 6,624,854 B1 | 9/2003 | Isogai et al. | 348/744 |
| 2001/0013843 A1 * | 8/2001 | Fujiwara et al. | 345/1.2 |

* cited by examiner

SYSTEM MENU

Fig.9

DEVICE MENU

PROJECTION DISPLAY SYSTEM, PROJECTOR AND MENU IMAGE DISPLAY METHOD FOR SAME

This is a Continuation of application Ser. No. 09/959,988 filed Nov. 14, 2001, which is a National Stage of Application No. PCT/JP01/02380 filed Mar. 23, 2001. The entire disclosure of the prior application is hereby incorporated by reference herein in its entirety.

TECHNICAL FIELD

The present invention relates to a technique for displaying images on a common projection screen using a plurality of projectors.

BACKGROUND ART

A plurality of projectors (projection type display devices) can constitute a projection display system for displaying an image on a common projection screen. In the above projection display system, a plurality of images produced on the projection screen by a plurality of projectors can be adjusted properly to display a single image.

Figure 11:
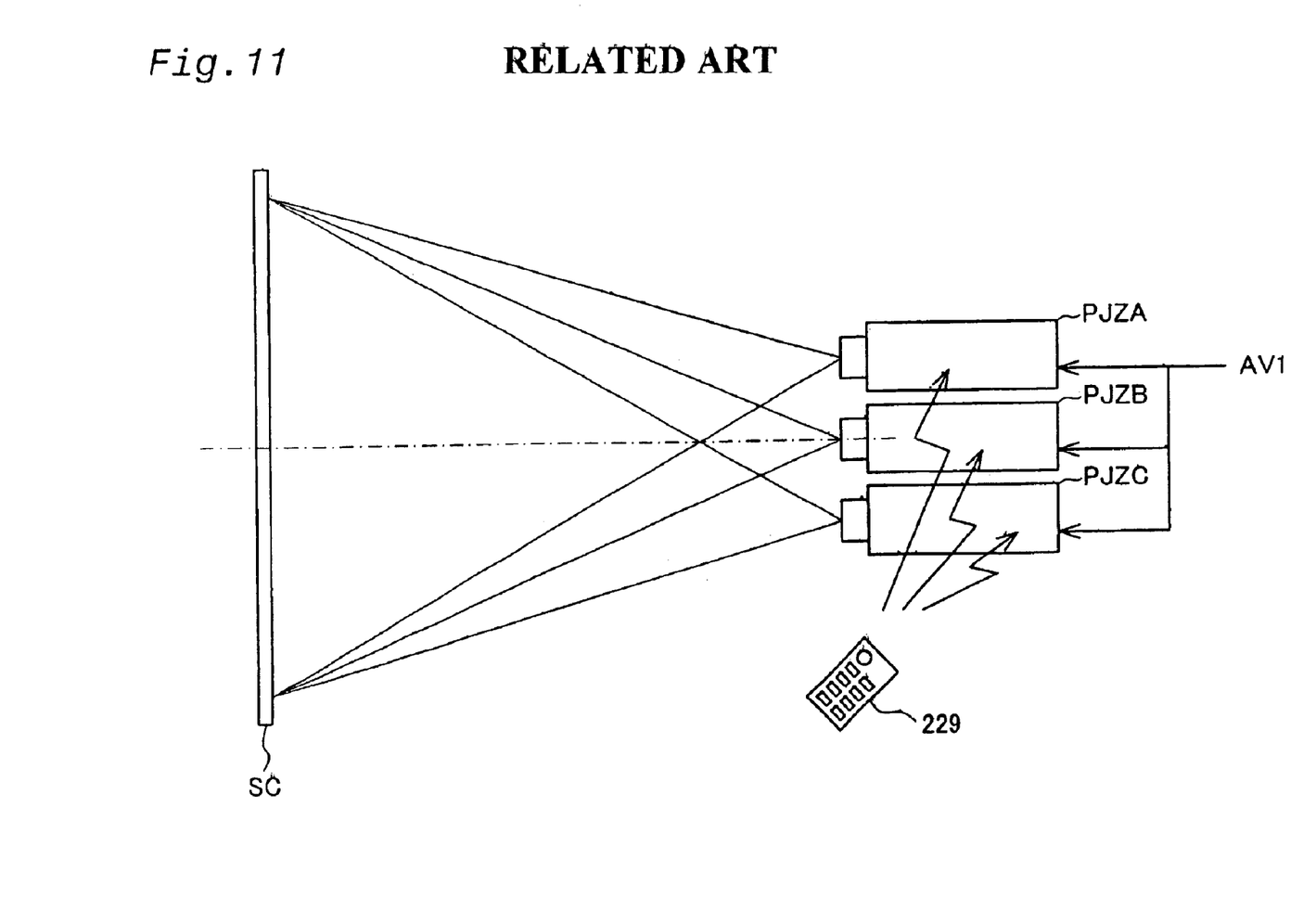
FIG. 11 is an illustrative diagram showing a conventional projection display system.

FIG. 11 is an illustrative diagram showing a conventional projection display system. The system shown in FIG. 11 comprises a stack of three projectors PJZA, PJZB and PJZC. Each projector displays an image based on an analog video signal AV1 supplied by an image supply device (not shown). The three projectors are controlled by a single remote controller 229.

In this conventional projection display systems, however, it is difficult to control each of the projectors PJZA, PJZB and PJZC. For example, when it is desired to control only one of the three projectors, since all of the projectors operate in the same manner in response to operation signals output from the single remote controller 229, control is difficult.

DISCLOSURE OF THE INVENTION

The object of the present invention is thus to solve the disadvantage of the prior art discussed above and to provide a technique for facilitating control of a plurality of projectors.

At least part of the above and the other related objects is attained by a projection display system comprising a plurality of projectors wherein a plurality of images projected by the projectors are displayed on a common projection screen. Each of the plurality of projectors includes: a control signal processor for processing a control signal given from an external device and generating a processed control signal; and a signal input/output section for input/output of the control signal and the processed control signal. The plurality of projectors are coupled in a cascade connection by means of interconnecting the signal input/output sections of the projectors. The control signal and the processed control signal include connection sequence data indicating the cascade connection sequence. The control signal processor of each projector includes a memory for storing, on the basis of a given control signal, a connection sequence when the projectors are coupled in a cascade connection.

By using the projection display system herein, the plurality of projectors can be controlled in the order of their connection, thereby facilitating control of the plurality of projectors.

In the above projection display system, data transmission by means of cascade connection of the plurality of projectors may be accomplished on the basis of a control signal supplied by an external control device connected to any of the projectors. The projector connected to the external control device may be determined to be a master projector on the basis of a given control signal and the other projectors may be determined to be slave projectors on the basis of another given control signal. The master projector can control the slave projectors.

In this way, by designating master and slave projectors by means of the external control device, it is a simple matter to achieve data transmission by means of cascade connection of the plurality of projectors.

It is preferable that the projection display system further includes: a remote controller for operating the plurality of projectors. The master projector processes an operation signal from the remote controller and operates the plurality of projectors on the basis of the operation signal; and the slave projectors do not perform processing according to the operation signal from the remote controller.

By having only the master projector processing control signals from the remote controller, it is possible to easily control the plurality of projectors by means of the remote controller.

It is also preferable that each of the plurality of projectors further includes a menu image processor for displaying a menu image over at least a portion of an image area displayed on the projection screen. The master projector causes the menu image processor of any of the plurality of projectors to display the menu image, and simultaneously causes the menu image processors of the other projectors to display a background image constituting a background of the menu image, at least in the menu image display area.

In this way, when any of the projectors displays a menu image, text or other symbols in the menu image can be readily identified.

It is preferable that the menu image includes an identifying symbol indicating the projector displaying the menu image.

In this way, it is easy to determine which projector is displaying a menu image, thereby facilitating control of each projector.

Settings relating to operating conditions for each projector may be transmitted to the external control device. The external control device may include a settings modification section allowing a user to verify and modify the settings of each projector.

In this way, it is easy to modify projector settings in the settings modification section provided to the external control device.

It is preferable that the operating status of each projector is transmitted to the master projector.

In this way, the master projector is able to ascertain the operational status of all projectors, whereby the projectors can be controlled according to their operational status.

When at least one of the plurality of projectors experiences an error, the master projector may cause at least one of the other projectors not experiencing an error to produce an error display.

In this way, when any of the projectors of the projection display system cannot project a display due to an error, another projector produces an error display, making it easy to ascertain if an error has occurred.

The present invention is also directed to a projector capable of constituting a projection display system wherein a plurality of images projected by a plurality of projectors are displayed on a common projection screen. The projector includes: a control signal processor for processing a control signal given from an external device and generating a processed control signal; and a signal input/output section for input/output of the control signal and the processed control signal. The signal input/output section is connected with a signal input/output section of another projector in order to couple the plurality of projectors in a cascade connection. The control signal and the processed control signal include connection sequence data indicating the cascade connection sequence. The control signal processor includes a memory for storing, on the basis of a given control signal, a connection sequence when the plurality of projectors are coupled in a cascade connection.

Where a plurality of such projectors are available, a projection display system of the type described hereinabove can be constructed, and a plurality of projectors can be controlled easily.

The present invention is also directed to a menu image display method for displaying a menu image in a projection display system comprising a plurality of projectors wherein a plurality of images projected by the projectors are displayed on a common projection screen. The method includes the steps of: (a) causing any of the plurality of projectors to display a menu image over at least a portion of an image area displayed on the projection screen; and (b) causing projectors other than the projector displaying the menu image to display, at least in the menu image display area, an image whereby symbols contained in the menu image are identifiable.

In this way, in the projection display system comprising the plurality of projectors, while any of the projectors displays a menu image, text or other symbols in the menu image can be readily identified, facilitating control of the plurality of projectors.

In the above menu image display method, it is preferable that the step (a) includes the step of displaying the menu image including an identifying symbol indicating the projector displaying the menu image.

In this way the projector displaying the menu image can be easily ascertained, thereby facilitating control of the projectors.

BRIEF DESCRIPTION OF THE DRAWINGS

FIGS. 5(A)–5(E') are illustrative diagrams showing processing in the event that projector settings are changed using remote controller 229;

FIGS. 6(A)–6(E') are illustrative diagrams showing individual images displayed by each projector during display of the synthesized images of FIG. 5;

BEST MODES OF CARRYING OUT THE INVENTION

Figure 1:
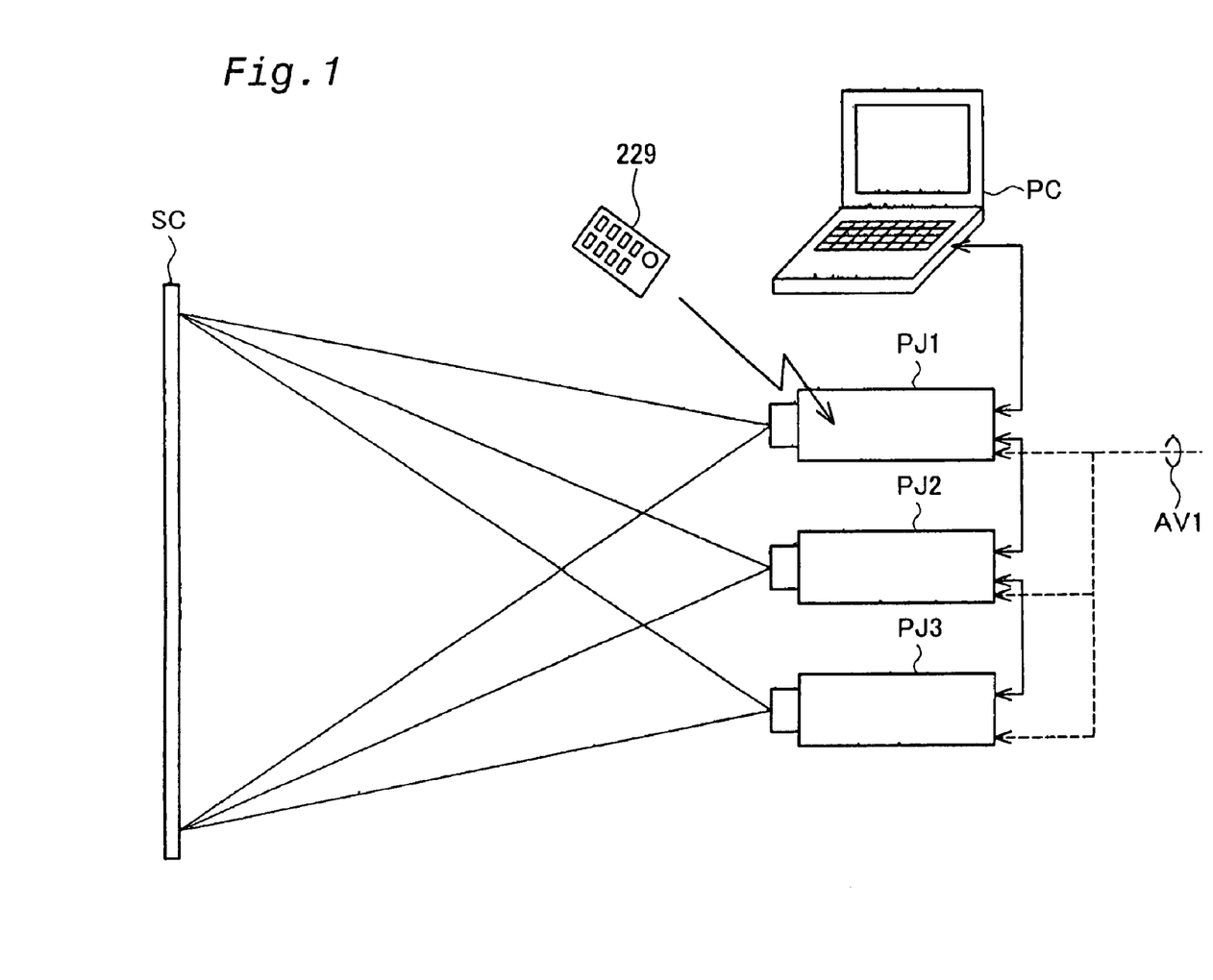
FIG. 1 is an illustrative diagram of a projection display system in an embodiment of the invention.

Some modes of carrying out the present invention are described below as embodiments. FIG. 1 is an illustrative diagram of a projection display system in an embodiment of the invention. The projection display system comprises three projectors PJ1–PJ3, a remote controller 229, and a personal computer PC. As in the conventional projection display system depicted in FIG. 11, each projector PJ1–PJ3 is supplied with an analog video signal AV1 by an image supply device (not shown). On the basis of the supplied analog video signal AV1 the projectors PJ1–PJ3 display the same given image on a screen SC. As a result, a synthesized, single bright image is displayed on screen SC.

In the projection display system of FIG. 1, the three projectors PJ1–PJ3 are coupled in a cascade connection by means of cables. During initialization of the system, the first projector PJ1 and the computer PC are also connected by a cable. The computer PC supplies a control signal to the first projector PJ1. The first projector processes the given control signal and supplies a processed control signal to the second projector. The procedure is the same for the other projectors. Where data transmission by means of a cascade connection on the basis of a control signal from the computer PC is enabled in this way, the three projectors function as a projection display system. At this time, the first projector PJ1 connected to the computer PC is set as the master projector, and the second and third projectors PJ2, PJ3 are set as slave projectors. The master projector PJ1 controls the two slave projectors PJ2, PJ3. As will be apparent from the preceding description, the computer PC corresponds to the "external control device" of the present invention.

Figure 2:
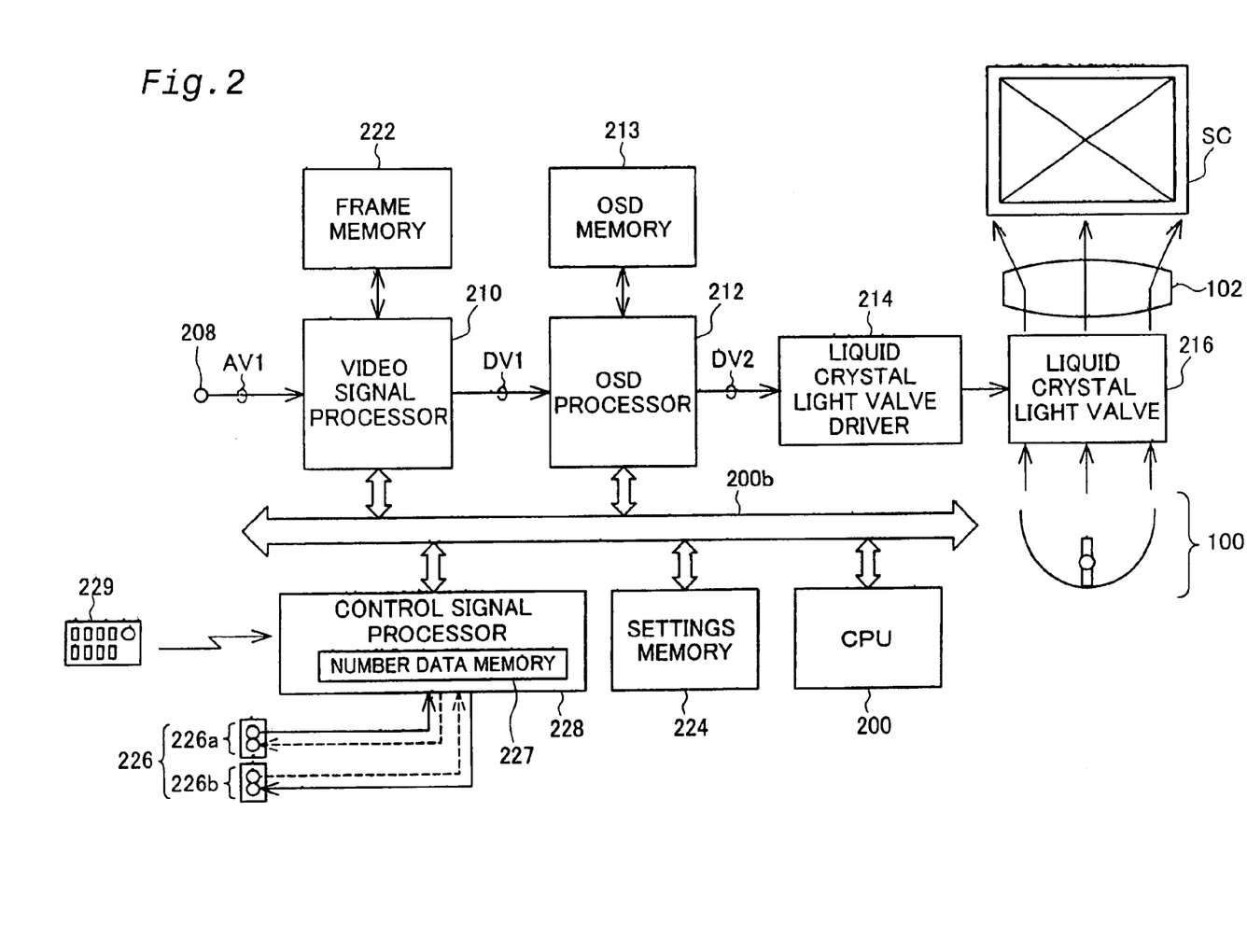
FIG. 2 is a block diagram of an exemplary internal arrangement in projectors PJ1–PJ3 of FIG. 1.

FIG. 2 is a block diagram of an exemplary internal arrangement in projectors PJ1–PJ3 of FIG. 1. Each projector comprises an video signal processor 210, an OSD (on screen display) processor 212, an OSD memory 213, a liquid crystal light valve driver 214, a liquid crystal light valve 216, a CPU 200, a frame memory 222, a settings memory 224, a control signal processor 228, an illuminating optical system 100, and a projection lens 102. The video signal processor 210, OSD processor 212, settings memory 224, control signal processor 228 and CPU 200 are interconnected by a bus 200b. The liquid crystal light valve 216 is substantially uniformly illuminated by means of the illuminating optical system 100, and the image formed by the liquid crystal light valve 216 is projected onto the screen SC by means of the projection lens 102. The illuminating optical system 100 and the projection lens 102 are simplified in the illustration of FIG. 2.

An analog video signal AV1 supplied by an image supply device (not shown) is given to image input terminal 208. The analog video signal AV1 is a video signal, for example, an RGB signal representing a computer image output by a personal computer, or a composite video signal representing motion video output by a video recorder or television receiver.

The video signal processor 210 has the functions of subjecting analog video signal AV1 to A/D conversion and writing the converted image data to the frame memory 222, and of reading image data from the frame memory 222. The video signal processor 210 supplies the read out image data DV1 to the OSD processor 212.

In response to a request from the control signal processor 228, the OSD processor 212 processes OSD image data representing a menu image, etc., to synthesize image data DV1. As will be described later, a user can control the functions of the projector components by means of this menu image.

The OSD memory 213 stores, in a predetermined format, graphics data, font data, and other data making up menu images. When a menu image is to be displayed, the OSD processor 212 reads the menu image data from the OSD memory 213 and generates the OSD image data. The OSD processor 212 synthesizes this OSD image data with the image data DV1 output from the video signal processor 210. Synthesis of image data DV1 and OSD image data in the OSD processor 212 can be performed using a selector circuit (not shown) provided in the OSD processor 212. Alternatively, they can be synthesized by performing operations on the two sets of image data using multipliers and adders. Where synthesis is performed by means of such operations, the image represented by image data DV1 and the menu image represented by OSD image data can be displayed to be semi-transparent.

The image data DV2 output from the OSD processor 212 is supplied to the liquid crystal light valve driver 214. The liquid crystal light valve driver 214 drives the liquid crystal light valve 216 in response to image data DV2. The liquid crystal light valve 216 modulates the light emitted by the illuminating optical system 100. The modulated light emitted from liquid crystal light valve 216 is projected onto the screen SC by the projection lens 102 so that the image is displayed on the screen SC.

The signal I/O section 226 comprises a first I/O terminal 226a and a second I/O terminal 226a. Cables are connected to the first and second I/O terminals 226a, 226b for electrical coupling to other devices. For example, if the device depicted in FIG. 2 is the first projector PJ1 of FIG. 1, the first and second I/O terminals 226a, 226b are electrically coupled to the computer PC and second projector PJ2, respectively. Analogously, if the device depicted in FIG. 2 is the second projector PJ2, the first and second I/O terminals 226a, 226b are electrically coupled to the first and third projectors PJ1, PJ3, respectively.

The control signal processor 228 (FIG. 2) controls the function of the various components of the projector on the basis of a control signal given from the computer PC via the signal I/O section 226. For example, under instructions from the computer PC, the control signal processor 228 can change settings relating to operating conditions stored in the settings memory 224. The video signal processor 210 and OSD processor 212 perform image processing according to the settings stored in the settings memory 224.

The control signal processor 228 also controls the functions of the various components of the projector on the basis of an operation signal from the remote controller 229. It should be noted that while the control signal processor 228 of the first projector PJ1—which functions as the master projector—performs processing on the basis of the operation signal from remote controller 229, the control signal processors 228 of the second and third projectors PJ2, PJ3—which function as the slave projectors—do not perform processing on the basis of the operation signal from the remote controller 229. Specifically, the control signal processors 228 of the second and third projectors PJ2, PJ3 set to slave status either prohibit reception of operation signals from the remote controller 229, or ignore the operation signals. The master projector PJ1 processes the operation signal from the remote controller 229 and operates all of the projectors PJ1–PJ3 on the basis of the operation signal. This allows each projector to be individually controlled using the remote controller 229. For example, the master projector PJ1, in response to an operation signal from the remote controller 229, causes the OSD processor 212 of any of the projectors to display a menu image (described later).

Figure 3:
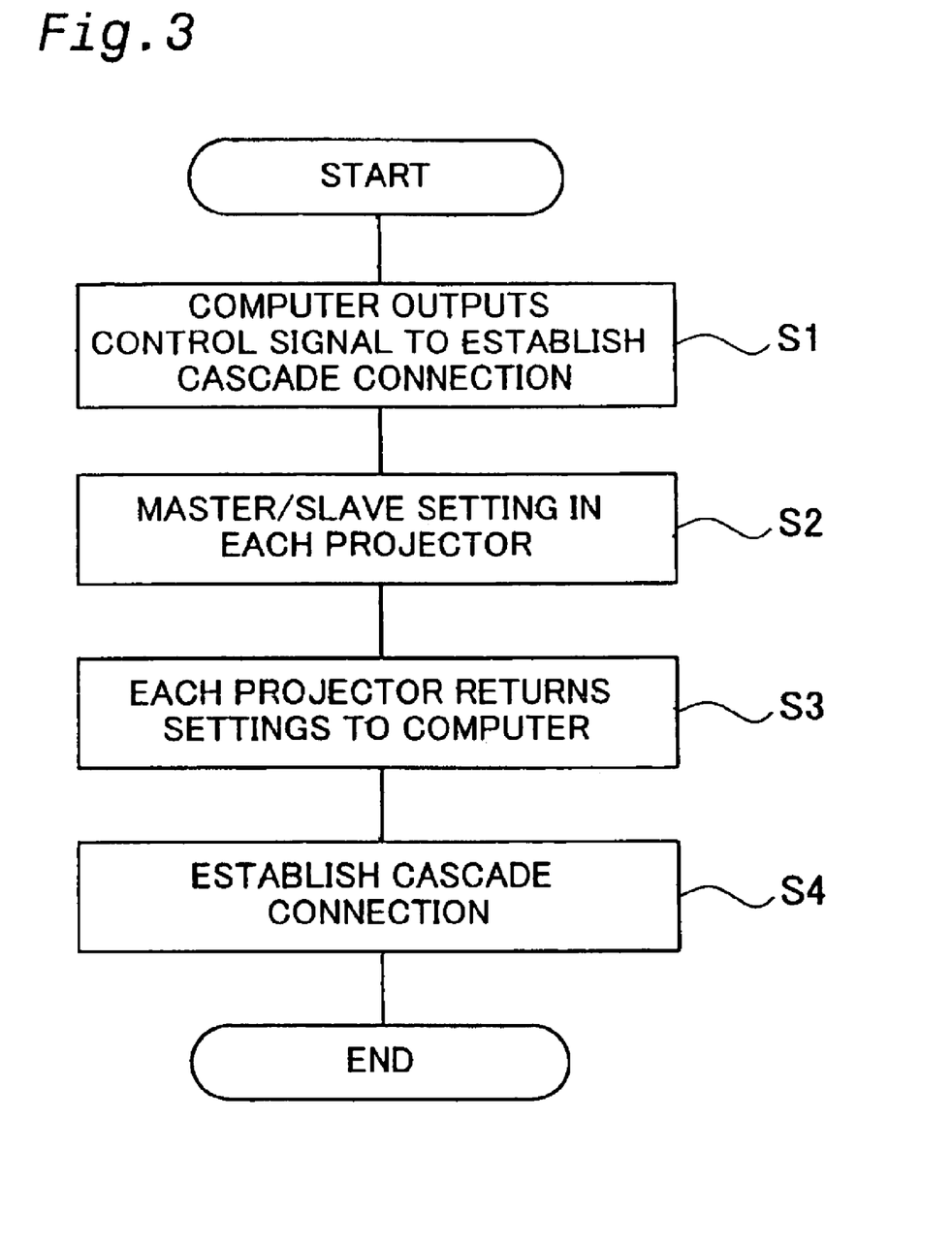
FIG. 3 is a flow chart of the procedure for establishing a cascade connection for the projectors.

FIG. 3 is a flow chart of the procedure for establishing a cascade connection for the projectors. Establishing a cascade connection refers herein to enabling data transmission among a plurality of projectors by means of a cascade connection. The process of establishing a cascade connection is mainly performed by an installer who installs the projectors in a conference room, etc. The steps in FIG. 3 are performed with the computer PC and three projectors pre-connected by means of cables in the manner depicted in FIG. 1.

In Step S1, the computer PC outputs a control signal to establish a cascade connection of the three projectors PJ1–PJ3. As shown in FIG. 1, the control signal from computer PC is given to the first projector PJ1.

In Step S2, master/slave settings are made in each of the projectors. Specifically, the control signal processor 228 (FIG. 2) of the first projector PJ1 processes a first control signal supplied from the computer PC, and outputs a first processed control signal. Analogously, second projector PJ2 processes the first processed control signal supplied by the first projector PJ1 and outputs a second processed control signal. The procedure is analogous for the third projector PJ3, except that the third processed control signal is not supplied to any device.

The control signal processor 228 of each projector determines the connection sequence when connected in a cascade connection on the basis of a given control signal. Specifically, the control signal contains number data indicating the sequence for cascade connection, and the control signal processor 228 of each projector processes a given control signal and outputs a processed control signal. For example, number data "1" indicating first place in a connection sequence, is supplied to the first projector PJ1. The first projector PJ1 recognizes the number data "1" and stores it in a number data memory 227 in the control signal processor 228. The first projector PJ1 then increments the supplied number data "1" to generate the number data "2", which is then output as a processed control signal. The procedure is the same for the second and third projectors. In this embodiment, one projector connected to the computer PC, namely, the projector PJ1 assigned number data "1", is determined to be the master projector. The other projectors, namely, projectors PJ2, PJ3 assigned number data "2" or higher, are determined to be the slave projectors.

In Step S3, the control signal processor 228 of each projector reads settings stored in the settings memory 224 and transmits them to the computer PC via a cable. Specifically, once each projector has been assigned number data, the assigned number data and the settings are output from the first I/O terminal 226a. Settings for the first projector PJ1 are transmitted directly to the computer PC. Settings for the second projector PJ2 are transmitted to the computer PC via the projector having the smaller assigned number data (i.e., first projector PJ1). The procedure for the third projector PJ3 is analogous. At this time, the control signal processor 228 of first projector PJ1 recognizes the number of projectors constituting the projection display system from the number data transmitted from the other projectors, together with their settings.

Once settings from each projector have been transmitted to the computer PC in this way, cascade connection is established for the projection display system (Step S4). In actual practice, cascade connection is established by assigning number data to each projector. However, by following the procedure of the present embodiment, the user (mainly the installer) can readily ascertain that cascade connection has been established.

Figure 4:
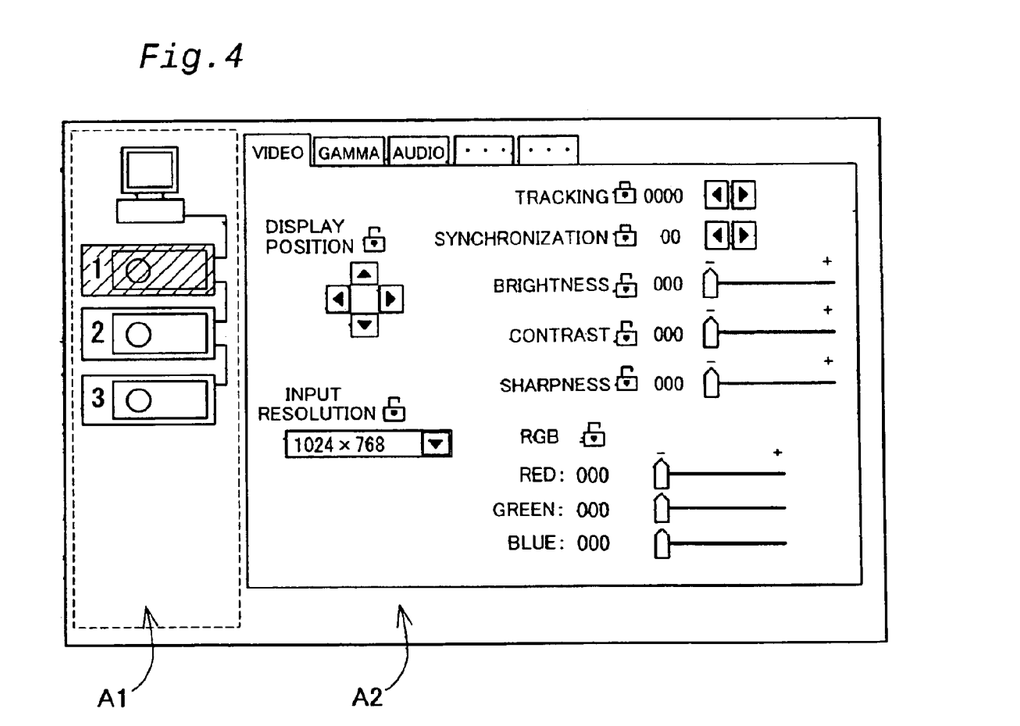
FIG. 4 is an illustrative diagram of the settings screen displayed on the computer PC (FIG. 1) in the event that a cascade connection for the projection display system has been established.

FIG. 4 is an illustrative diagram of a settings screen displayed on the computer PC (FIG. 1) in the event that a cascade connection for the projection display system has been established. The settings screen includes a connection status display area A1 indicating connection status of the projection display system of FIG. 1, and a settings display area A2 indicating settings for each projector.

The connection status display area A1 shows that the three projectors PJ1–PJ3 are connected to the computer PC in a cascade connection. If four projectors are connected in a cascade connection, four projectors arranged in a cascade connection will be displayed. In the display area A1 in FIG. 4, the first projector PJ1 with a symbol "1" appended thereto is selected. At this time, settings for the first projector PJ1 are indicated in the settings display area A2. Specifically, as shown in FIG. 4, settings relating to operating conditions for the projector, such as video settings—input resolution, tracking, and contrast—and audio settings, are shown.

While verifying the settings for each projector on the settings screen displayed on the display section of the computer PC (FIG. 1), the installer may modify settings using the mouse and keyboard. If settings are modified via the settings screen, settings stored in the settings memory 224 of each projector are modified via the cable. As will be apparent from this description, the input section (e.g. mouse and keyboard) of the computer PC (FIG. 1), the RAM storing the program for displaying the settings screen, and the display section (e.g. display) in the present embodiment correspond to the "settings modification section" of the present invention.

The key-shaped figure shown to the right side of each item in the settings display area A2 indicates whether settings are Locked or Unlocked. In the Locked state, settings cannot be changed, whereas they can be changed in the Unlocked state. In FIG. 4, two items—"Tracking" and "Synchronization"—are depicted in the Locked state, with the other items being in the Unlocked state. Since the settings screen in the present embodiment is provided with a Lock function, the installer may lock specific items to prevent ordinary users from modifying these settings.

In this way, once a cascade connection has been established for the plurality of projectors, the projectors function as a projection display system. Since the computer PC is no longer needed once a cascade connection has been established, the cable connecting the computer PC and first projector PJ1 shown in FIG. 1 is disconnected. This enables the system to be used by ordinary users. Users can, however, still modify settings for each projector using remote controller 229.

Figure 5:
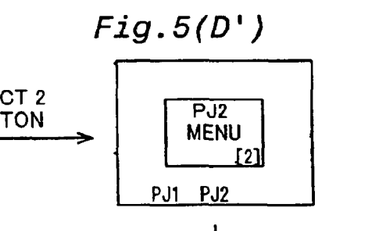
Figure 5A:
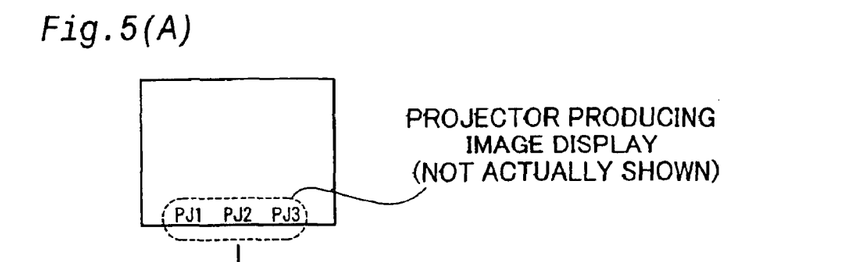

FIGS. 5(A)–5(E') are illustrative diagrams showing processing in the event that projector settings are changed using remote controller 229. FIGS. 5(A)–5(E), 5(D') and 5(E') show synthesized images displayed on the screen SC by the three projectors JP1–JP3. FIGS. 6(A)–6(E') are illustrative diagrams showing individual images displayed by each projector during display of the synthesized images of FIGS. 5(A)–5(E'). Images in the first column at left in FIGS. 6(A)–6(E), 6(D') and 6(E') depict the same synthesized images as FIGS. 5(A)–5(E), 5(D') and 5(E'). Images in the second column depict individual images displayed by the first (master) projector PJ1 in the states depicted in the first column. Analogously, images in the third and fourth columns depict individual images displayed by the second and third projectors PJ2, PJ3. The following description is in accordance with FIGS. 5(A)–5(E'), making occasional reference to FIGS. 6(A)–6(E').

FIG. 5(A) depicts the image shown on the screen SC during normal image display. At this time, the three projectors PJ1–PJ3 display the individual images indicated in FIG. 6(A). Each of the symbols "PJ1", "PJ2", and "PJ3" at the bottom of the display images in FIGS. 5(A)–5(E') and 6(A)–6(E') denotes the projector displaying the image. However, these symbols are not visible on the actual display.

Figure 5B:
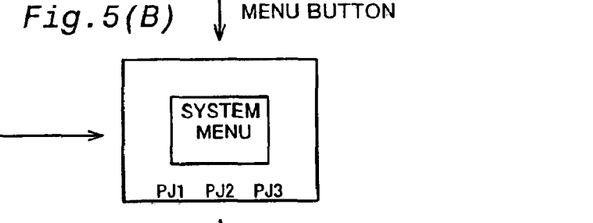
Figure 7A:
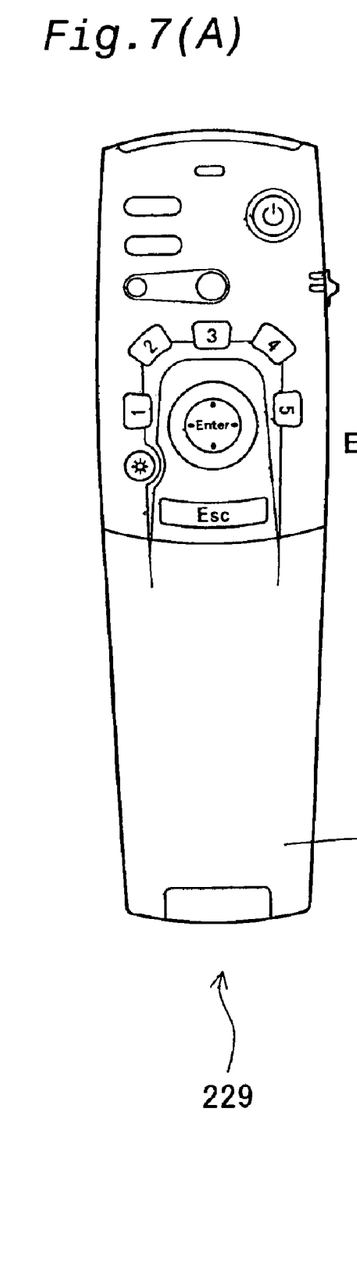
FIGS. 7(A) and 7(B) are illustrative diagrams showing the remote controller 229 in enlarged view.
Figure 7B:
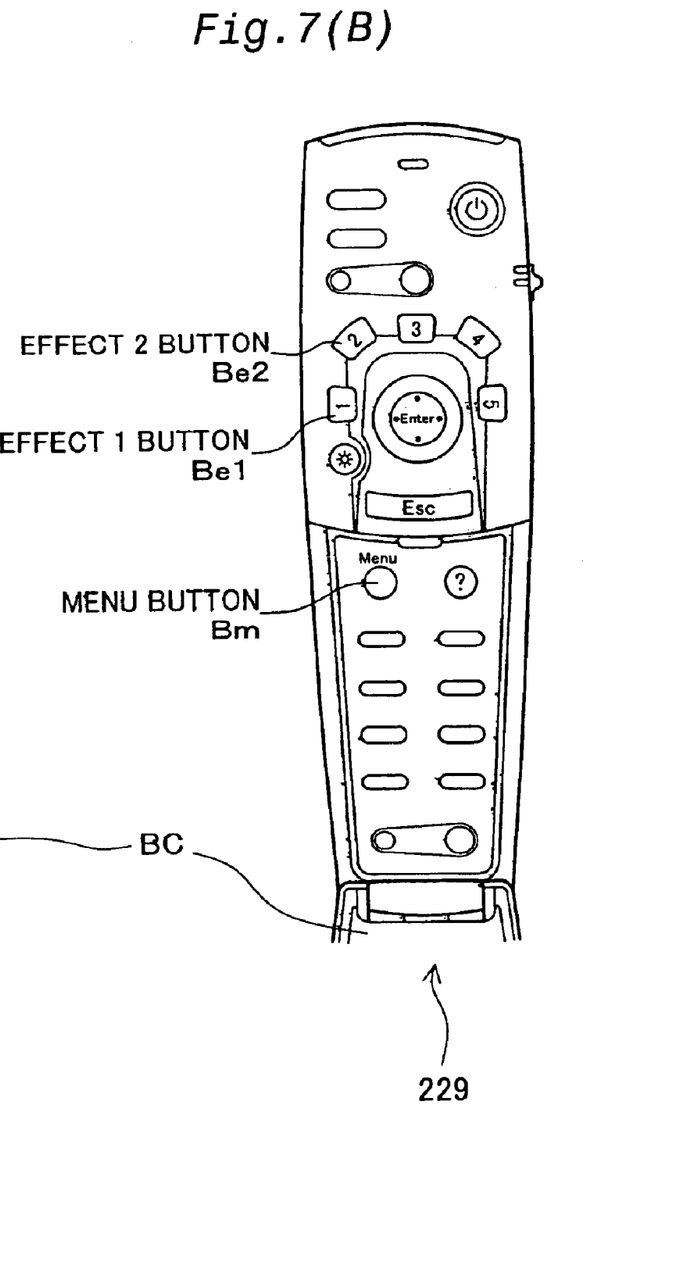

FIG. 5(B) depicts the image displayed when a user simultaneously modifies settings for all projectors using the remote controller 229. FIGS. 7(A) and 7(B) are illustrative diagrams showing the remote controller 229 in enlarged view. FIGS. 7(A) and 7(B) show the button cover BC of remote controller 229 in the closed and open state, respectively. As shown, the remote controller 229 is provided with a multitude of buttons. In the process illustrated in FIGS. 5(A)–5(E'), a Menu button Bm, Effect 1 button Be1, and Effect 2 button Be2 are used. When the user selects the Menu button Bm, the system assumes System Control mode allowing settings for all projectors to be modified simultaneously. As shown in FIG. 5(B), in System Control mode, a System Menu image for simultaneously setting all of the projectors PJ1–PJ3 is displayed.

Figure 8:
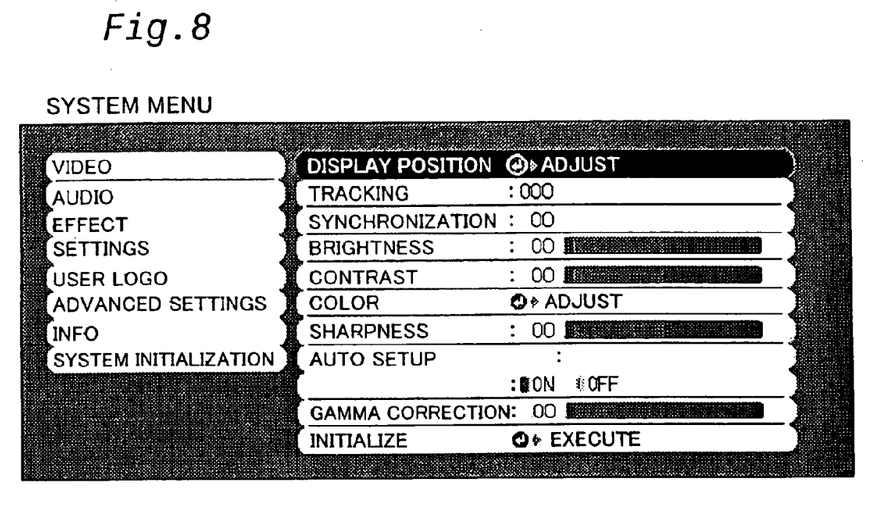
FIG. 8 is an illustrative diagram showing an exemplary System Menu image displayed on screen SC.

FIG. 8 is an illustrative diagram showing an exemplary System Menu image displayed on the screen SC. As shown in FIG. 8, the System Menu image includes essentially the same items as the settings screen in FIG. 4. By operating the remote controller 229, the user can change settings for all items.

Figure 6:
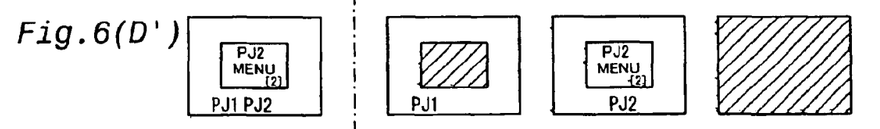
Figure 6A:
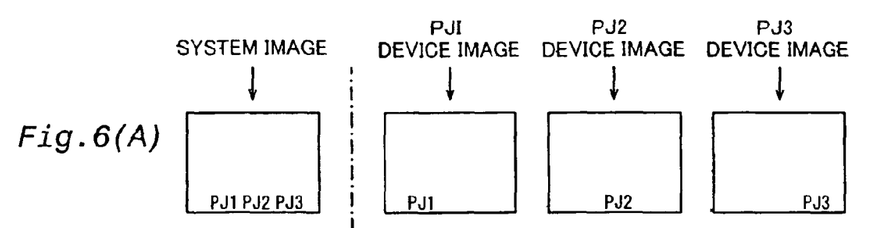
Figure 6B:
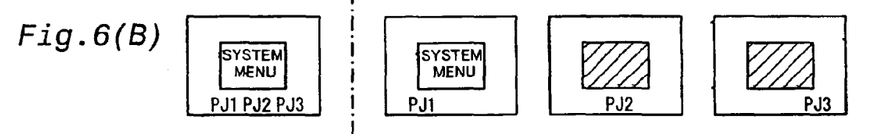

In the state shown in FIG. 5(B), the master projector PJ1 displays an image that includes a System Menu, as shown in FIG. 6(B), while the slave projectors PJ2, PJ3 display images that are black in the menu image display area. In this way, when projectors other than the projector displaying the menu image display images that are black in the menu image display area, the menu image may be displayed in an easy to view manner.

Figure 5C:
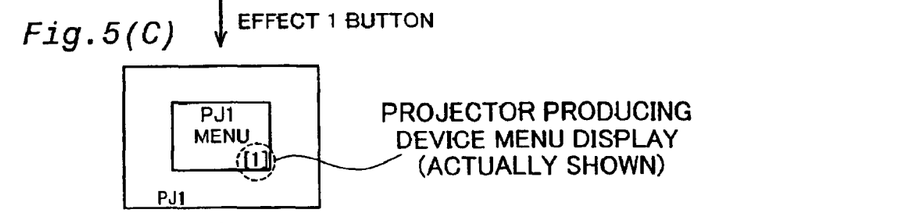
Figure 6C:
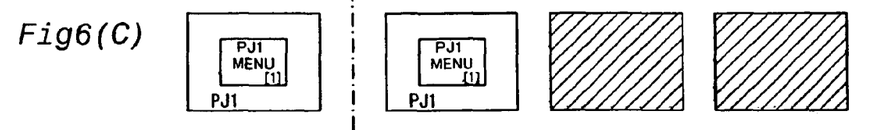

FIG. 5(C) depicts the image displayed for modifying settings for the first projector PJ1 only. This mode is displayed when the user selects the Effect 1 button Be1 on the remote controller 229 (FIG. 6) in the state depicted in FIG. 6(B). Specifically, when the user selects the Effect 1 button Be1, the system enters a Device Control mode allowing settings of an individual projector to be modified. At this time, as shown in FIG. 6(C), the first projector PJ1 displays an image that includes a Device Menu, while the second and third projectors PJ2, PJ3 display images that are black over the entire image area. This enables display of the image of first projector PJ1 alone, allowing adjustments such as image brightness to be easily set for the individual first projector PJ1.

Figure 9:
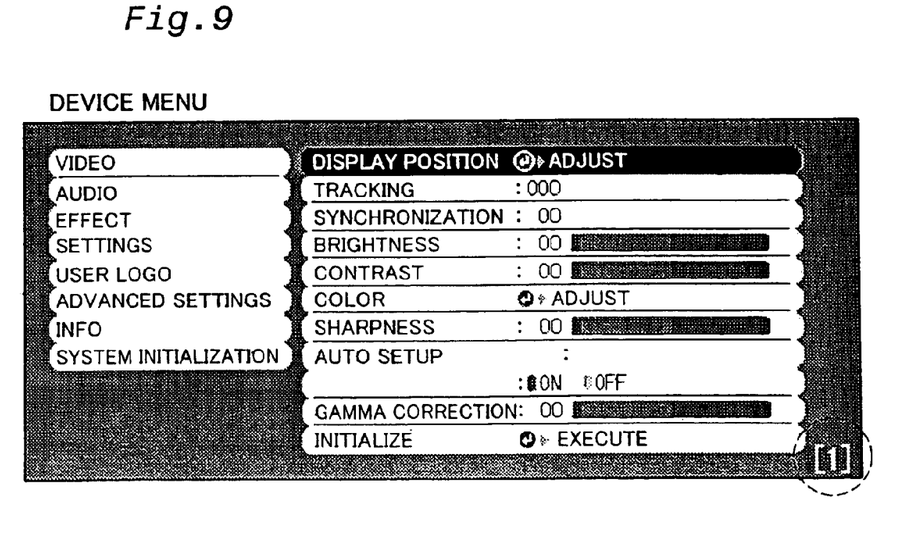
FIG. 9 is an illustrative diagram showing an exemplary Device Menu image displayed on screen SC.

FIG. 9 is an illustrative diagram showing an exemplary Device Menu image displayed on the screen SC. As shown in FIG. 9, the Device Menu image is substantially similar to the System Menu image of FIG. 8. However, when the Device Menu image is displayed, the image contains an identifying symbol indicating the projector displaying the Device Menu. FIG. 9 shows the Device Menu image displayed by the first projector PJ1 depicted in FIG. 5(C). At the bottom right of the Menu image there is an identifying symbol "1" indicating the first projector PJ1. This allows users to easily ascertain which projector is displaying the menu image, thereby facilitating modification of settings for an individual projector.

Figure 5D:
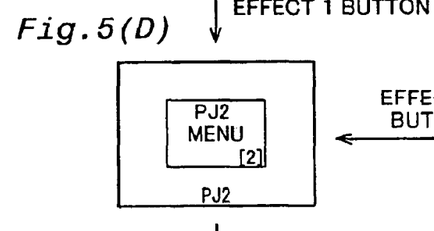
Figure 5E:
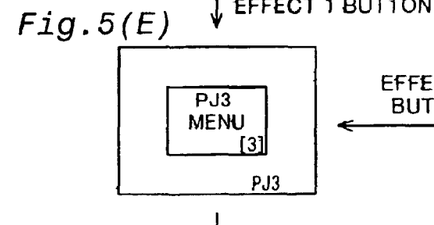
Figure 6D:
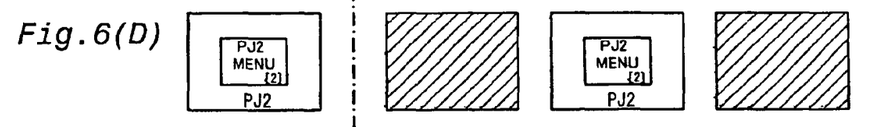
Figure 6E:
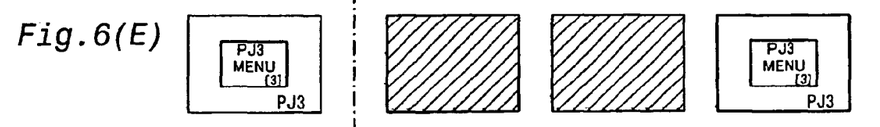

FIG. 5(D) shows the image displayed for modifying settings for the second projector PJ2 only. This mode is displayed when the user reselects the Effect 1 button Be1 on the remote controller 229 (FIG. 6) in the state depicted in FIG. 5(C). At this time, as shown in FIG. 6(D), the second projector PJ2 displays an image that includes a Device Menu, while the first and third projectors PJ1, PJ3 display images that are black over the entire image area. FIG. 5(E) is analogous. In the state depicted in FIG. 5(E), reselecting the Effect 1 button Be1 on the remote controller 229 returns the system to the state depicted in FIG. 5(B).

In projection display systems it is necessary for the images displayed by a plurality of projectors to be mutually aligned. Specifically, the display location, size and shape of images produced by each projector must be aligned. This may be accomplished by selecting the image displayed by any one of the projectors as a reference, and aligning the images of the other projectors with it. In the projection display system of this embodiment, simultaneous display by the master projector PJ1 and one other projector is enabled. Thus, the image displayed by the master projector PJ1 can be used as a reference image, and the image displayed by the other projector aligned therewith.

FIG. 5(D') depicts an image produced by simultaneous display by the master projector PJ1 and second projector PJ2, when it is desired to modify settings of the second projector PJ2 only. This mode is enabled by selecting the Effect 2 button Be2 on the remote controller 229 (FIG. 6) in the state depicted in FIG. 5(D). At this time, as shown in FIG. 6(D'), the second projector PJ2 displays an image that includes a Device Menu, while the master projector PJ1 displays an image that is black over the menu area. The third projector PJ3 displays black over the entire image area. In the state depicted in FIG. 5(D'), reselecting the Effect 2 button Be2 returns the system to the state depicted in FIG. 5(D). In the state depicted in FIG. 5(E), reselecting the Effect 2 button Be1 places the system in the state depicted in FIG. 5(E'), producing simultaneous display by the master projector PJ1 and third projector PJ3, as depicted in FIG. 6(E').

In the states depicted in FIGS. 5(B)–5(E), 5(D') and 5(E'), selecting the Menu button Bm returns the system to the normal display mode depicted in FIG. 5(A).

By causing projectors other than the projector displaying the menu image to display black images in the menu image display area, the menu image can be effectively displayed. In the present embodiment, projectors not displaying menu images display solid black images, but in an alternative arrangement could display solid images of other colors, such as blue or green. An image containing an unobtrusive pattern could be used in place of a solid image. In general, each of the projectors other than the projector displaying the menu image will display an image such that text or other symbol in the menu image is clearly identifiable, at least in the menu image display area. This image corresponds to the "background image constituting the background of the menu image" of the present invention.

As noted, in the present embodiment the OSD processor 212 and OSD memory 213 of each projector shown in FIG. 2 produce a menu image display according to an instruction from the control signal processor 228. As will be apparent from this description, the OSD processor 212 and OSD memory 213 in this embodiment correspond to the "menu image processor" of the present invention.

In the projection display system (FIG. 1) of this embodiment, the control signal processor 228 of the master projector PJ1 has the function of monitoring the operating status of all projectors PJ1–PJ3. That is, the slave projectors PJ2, PJ3 transmit their respective projector operating status to the master projector PJ1. In this way, the master projector PJ1 can ascertain whether all projectors PJ1–PJ3 are operating normally or not. The control signal processor 228 of the master projector PJ1 controls projectors PJ1–PJ3 in such a way that when any of the projectors is incapable of projection display, the other projectors capable of projection display will project a predetermined message. This predetermined message is, for example, an error message. Where the three projectors PJ1–PJ3 have different warm-up times until they are ready to display after initial power-up, the predetermined message may indicate which of the projectors is not ready.

Possible errors of this kind include, for example, failure of the lamp of the illuminating optical system 100 (FIG. 1) of one of the projectors to light; halting of a cooling fan (not shown); or a marked increase in temperature in a projector due to a drop in the speed of the fan. Such errors may be detected by means of current flowing through the lamp, current flowing through the fan, or the temperature within the projector. Alternatively, the operation of video signal processor 210 or other component may be monitored to detect errors, and an error display may be produced if one has occurred. In general, it is preferably to produce an error display in the event that image display is not possible or there is a risk that image display will become impossible (for example, normal operation will become impossible because of increasing internal temperature).

Figure 10A:
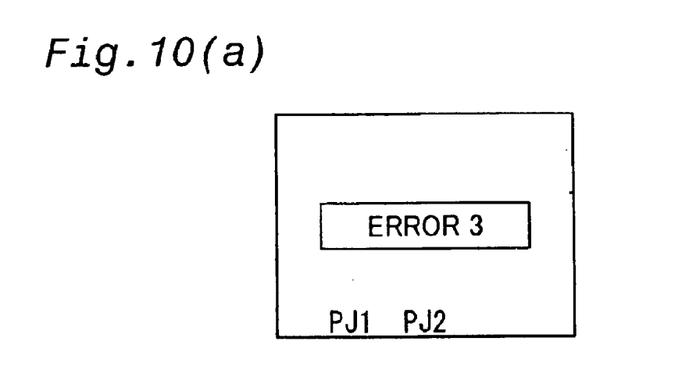
FIGS. 10(a)–10(d) are illustrative diagrams showing an error display displayed in the event that an error has occurred in the third projector PJ3.
Figure 10B:
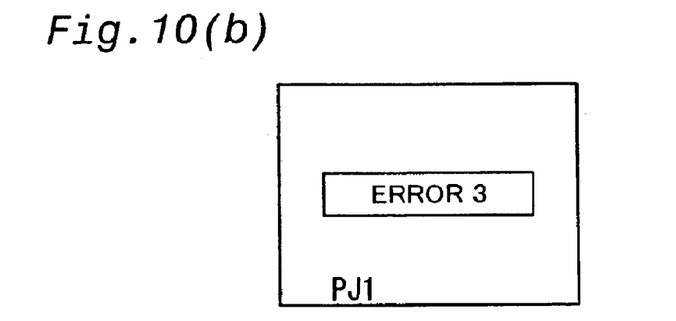
Figure 10C:
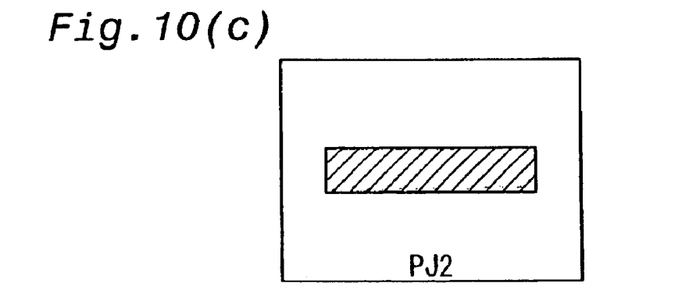
Figure 10D:
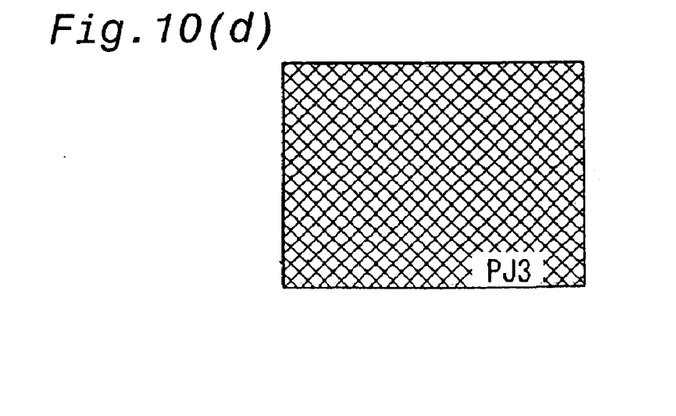

FIGS. 10(a)–10(d) are illustrative diagrams showing an error display displayed in the event that an error has occurred in the third projector PJ3. FIG. 10(a) shows the synthesized image displayed on the screen SC. FIGS. 10(b)–10(d) show individual images displayed by the individual first to third projectors PJ1–PJ3. In FIGS. 10(a)–10(d), it is presumed that an error has occurred in the third projector PJ3, so the third projector PJ3 displays no image, as depicted in FIG. 10(d). At this time the master projector PJ1 displays an image that contains an error message, as depicted in FIG. 10(a). In the present embodiment, the message "ERROR 3" is displayed. This message informs the user that an error has occurred in third projector PJ3. The second projector PJ2 displays a black image in the error message display area, as depicted in FIG. 10(c). This allows the error message, like the menu image described hereinabove, to be displayed in a readily visible manner.

In the present embodiment, only the message "ERROR" is displayed, but it would be possible to display a specific description of the error. For example, a "FAN STOP 2" message can be displayed when fan of the second projector PJ2 has stopped.

In FIGS. 10(a)–10(d) the error message is displayed by the first projector PJ1, but the second projector PJ2 may be used to display the error message. Alternatively, the error message may be displayed simultaneously by both the first and second projectors PJ1, PJ2. In general, the master projector, in the event that at least one of a plurality of projectors has experienced an error, causes at least one of the projectors not experiencing an error to display an error message.

As noted, the control signal processor 228 of the master projector PJ1 monitors the operating status of all projectors PJ1–PJ3. Thus, the projection display system of the present embodiment may be designed such that projection display is performed only if all projectors PJ1–PJ3 have the same operating status. For example, it may be that at power-up of the projection display system the projectors have different warm-up times until they are ready to display. Or, if the temperature in a projector is high, the lamp may need to be extinguished to allow the unit to cool down. In such instances, the system waits until standby mode—in which each projector is ready to display—and initiates projection with one accord only when each projector has entered standby mode.

As noted, in the projection display system of the present embodiment the operating status of each projector is supplied to the master projector via a cable. Thus, the system can initiate projection only when all projectors have entered standby mode, or, when an error is detected in one of the projectors, cause the other projectors to display an error message.

As noted in the preceding description, each of the projectors of the projection display system of the present embodiment comprises the control signal processor 228 for processing the control signal given from the external device and generating the resultant processed control signal, and the signal I/O section 226 for input/output the control signal and the processed control signal. By interconnecting the signal I/O sections of the projectors, the plurality of projectors are coupled in a cascade connection. When the projectors are coupled in a cascade connection, the control signal processor of each projector stores in memory the connection sequence, based on the given control signal. In this way the plurality of projectors constituting the projection display system can be readily controlled on the basis of connection sequence.

In the projection display system of the present embodiment, during display of a menu image, any one of the plurality of projectors displays a menu image over at least a portion of the image area displayed on the projection screen, and the projectors other than the projector displaying the menu image display a background image constituting the background of the menu image, at least in the menu image display area. Thus, text or other symbols contained in the menu image are clearly recognizable, facilitating control of the plurality of projectors.

While the present embodiment describes a method for display of menu images in a cascade connection projection display system, the menu image display method herein may generally be implemented in any projection display system comprising a plurality of projectors, and wherein a plurality of images projected by the projectors are displayed on a common projection screen.

The present invention is not restricted to the above embodiments or their modifications, but there may be many other modifications, changes, and alterations without departing from the scope or spirit of the main characteristics of the present invention. Some possible modifications are given below.

(1) Whereas in the preceding embodiment the projection display system comprises a stack of three projectors, the projection display system may instead comprise a stack of two, or four or more, projectors. The projection display system is not limited to one in which the projectors are stacked vertically; a projection display system in which the projectors are arrayed on the horizontal is also possible. Alternatively the projection display system may have a plurality of projectors situated in separate locations.

Whereas in the preceding embodiment, the three images projected by three projectors are aligned to display a single image, the projection display system and projectors of the present invention may be applicable to such that the plurality of images projected by the projectors are displayed in a row.

Whereas in the preceding embodiment the projectors are supplied with the same given analog video signal AV1, as shown in FIG. 1, in an alternative arrangement a different analog video signal may be supplied to each of the plurality of projectors. By so doing different images can be displayed on the screen SC.

In general, the present invention may be applicable to projection display systems comprising a plurality of projectors, and wherein a plurality of images projected by the projectors are displayed on a common projection screen.

(2) Whereas in the preceding embodiment the cable connecting the first projector PJ1 to the computer PC is disconnected after cascade connection has been established, it is not necessary to disconnect the cable. This allows users to change settings on the settings screen displayed on the display section of the computer PC, in addition to the remote controller 229.

(3) Whereas in the preceding embodiment cables are employed for the cascade connection in the projection display system, a wireless cascade connection that does not employ cables is possible as well. In this instance, where a projection display system comprises, for example, projectors stacked vertically, signal I/O sections for wireless signal input/output from/to adjacent devices may be provided on the top and bottom faces of each projector. This allows the connection sequence to be determined according to the stacking sequence.

(4) Whereas in the preceding embodiment a liquid crystal light valve 216 (FIG. 2) is used as the electro-optical device of the projector, various other devices that emit light in response to video signals to produce an image may be used as the electro-optical device. For example, a micro-mirror type light modulator, such as DMD (Digital Micro-mirror Device) (trade mark of TI), may be used. Also, a high-luminance CRT and plasma display panel may be used.

(5) Some of the functions performed by hardware in the preceding may instead by accomplished by software, and conversely some of the functions performed by software may be accomplished by hardware.

INDUSTRIAL APPLICABILITY

The present invention is applicable to projection onto a screen of images supplied by a computer, video recorder, or other device.

What is claimed is:

1. A menu image display method for displaying a menu image in a projection display system comprising a plurality of projectors wherein a plurality of images projected by the projectors are displayed on a common projection screen, the method comprising the steps of:

(a) causing any of the plurality of projectors to display a menu image over at least a portion of an image area displayed on the projection screen; and (b) causing projectors other than the projector displaying the menu image to display, at least in the menu image display area, an image whereby symbols contained in the menu image are identifiable.

2. The menu image display method according to claim 1, wherein the menu image includes an identifying symbol indicating the projector displaying the menu image.

3. The menu image display method according to claim 1, wherein the image that causes the symbols contained in the menu image to be identifiable is a black image.

4. The menu image display method according to claim 1, further comprising:

preparing the plurality of projectors prior to the step (a), wherein the preparing step comprises:

coupling the plurality of projectors in a cascade connection; and allocating a cascade connection sequence to each of the plurality of projectors by supplying connection sequence data indicating the cascade connection sequence to each of the plurality of projectors.

5. The menu image display method according to claim 4, wherein the menu image includes an identifying symbol indicating the projector displaying the menu image, and the identifying symbol is the cascade connection sequence allocated to the projector displaying the menu image.

6. The menu image display method according to claim 4, wherein based on the allocated cascade connection sequences, one of the plurality of projectors is set to be master and projectors other than the master projector are set to be slave.

7. The menu image display method according to claim 6, further comprising:

(c) modifying a setting value of at least one of the plurality of projectors through the menu image, wherein the step (c) includes:

if the setting values of the plurality of projectors are to be modified simultaneously, causing the master projector to display the menu image, and if the setting value of one target projector selected from the plurality of projectors is to be modified independently, causing the target projector to display the menu image.

* * * * *

UNITED STATES PATENT AND TRADEMARK OFFICE
CERTIFICATE OF CORRECTION

| | | |
|---|---|---|
| PATENT NO. | : 6,932,481 B2 | Page 1 of 1 |
| APPLICATION NO. | : 10/902154 | |
| DATED | : August 23, 2005 | |
| INVENTOR(S) | : Takaaki Koyama et al. | |

It is certified that error appears in the above-identified patent and that said Letters Patent is hereby corrected as shown below:

On Title Page, Col. 1

(63)  Change "Continuation of Application No. 09/959,988, filed as Application No. PCT/JP01/0230 on March 23, 2001" to --Continuation of Application No. 09/959,988, now Patent No. 6,840,625, filed as Application No. PCT/JP01/02380 on March 23, 2001--.

Signed and Sealed this

First Day of August, 2006

JON W. DUDAS
*Director of the United States Patent and Trademark Office*